(12) United States Patent
Lin et al.

(10) Patent No.: US 8,049,961 B2
(45) Date of Patent: Nov. 1, 2011

(54) LENS UNIT AND PROJECTION SCREEN MADE OF THE SAME

(75) Inventors: Ding-Zheng Lin, Hsinchu (TW); Yaw-Ting Wu, Hsinchu (TW); You-Chia Chang, Hsinchu (TW); Chun-Hsiang Wen, Hsinchu (TW); Jyi-Tyan Yeh, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 109 days.

(21) Appl. No.: 12/559,889

(22) Filed: Sep. 15, 2009

(65) Prior Publication Data

US 2010/0165459 A1    Jul. 1, 2010

(30) Foreign Application Priority Data

Dec. 11, 2008  (TW) ................................ 97148153 A
Jun. 24, 2009  (TW) ................................ 98121128 A

(51) Int. Cl.
    *G03B 21/60*   (2006.01)
(52) U.S. Cl. ........ 359/454; 359/455; 359/449; 359/443; 359/627
(58) Field of Classification Search .................... 359/19, 359/201.1, 207.6, 355, 443, 449, 451–452, 359/454–455, 459, 611, 627, 896
See application file for complete search history.

(56) References Cited

U.S. PATENT DOCUMENTS

| 1,942,841 | A | * | 1/1934 | Takeo Shimizu | 359/455 |
| 3,704,055 | A | * | 11/1972 | Hong | 359/455 |
| 4,298,246 | A | * | 11/1981 | Iwamura | 359/448 |
| 5,096,278 | A | * | 3/1992 | Yoshioka et al. | 359/459 |
| 5,870,224 | A | * | 2/1999 | Saitoh et al. | 359/456 |
| 6,144,491 | A | * | 11/2000 | Orikasa et al. | 359/452 |
| 6,829,086 | B1 | * | 12/2004 | Gibilini | 359/453 |
| 7,102,819 | B2 | * | 9/2006 | Chang | 359/456 |
| 7,453,635 | B2 | * | 11/2008 | Yeo et al. | 359/453 |
| 7,667,893 | B2 | * | 2/2010 | Peterson et al. | 359/455 |
| 2006/0103930 | A1 | * | 5/2006 | Peterson | 359/454 |
| 2010/0103513 | A1 | * | 4/2010 | Chuang et al. | 359/449 |

FOREIGN PATENT DOCUMENTS

TW          293887       12/1996

* cited by examiner

*Primary Examiner* — Clayton E LaBalle
*Assistant Examiner* — Kevin Butler
(74) *Attorney, Agent, or Firm* — Muncy, Geissler, Olds & Lowe, PLLC

(57) ABSTRACT

A lens unit and a projection screen made of the same are disclosed. The lens unit includes a micro lens having a light incident surface and a light emergent surface opposing to the light incident surface; a light absorbing layer formed on the light emergent surface of the micro lens and having a cavity formed therein; a scattering layer formed in the cavity of the light absorbing layer and including a transparent resin blended with scattering particles; and a reflective layer formed on the light absorbing layer and the scattering layer. The projection screen includes a plurality of the lens units, thereby achieving high contrast and high energy utilization efficiency of incident light with a large viewing angle.

17 Claims, 10 Drawing Sheets

LENS UNIT AND PROJECTION SCREEN MADE OF THE SAME

BACKGROUND OF THE INVENTION

1. Field of the Invention

The present invention generally relates to lens units and projection screens made of the same, and more particularly to a lens unit with a scattering layer comprising a transparent resin blended with scattering particles and a projection screen including the lens unit.

2. Description of Related Art

Currently, projectors and projection screens have been widely used in teaching, meeting presentation, advertising, entertainment and so on. Although the projectors and projection screens are improved with advanced technology, some drawbacks exist in the front projection technology used in a projector or projection screen. For example, when using the projector or projection screen, the ambient light from the ambient environment of the projector will adversely affect the projection. When the ambient light becomes stronger, the contrast of projection images on the projection screen becomes worse. As a result, it becomes difficult to clearly see the content of the projection images. Therefore, it is necessary to eliminate the ambient light, which is normally hard eliminated. Nevertheless in usual circumstances, such as in teaching or meeting presentations, complete elimination of the ambient light will cause inconvenience to the audiences who may need to make some notes.

On the other hand, along with the rapid development of high luminance white light LEDs and RGB laser diodes, the projectors are developing towards miniaturization and portability. However, miniaturized projectors lack high luminance light sources. Therefore, poor contrast of projection images on the projection screen caused by the ambient light becomes much more serious.

To overcome the above-described drawback of the ambient light causing the poor contrast, the projection screens in the prior art were all designed to selectively absorb the ambient light and reflect the light from the projector light source due to difference between the light from the projector light source and the ambient light.

In order to maximally reflect the light from the projector light source and reject the ambient light so as to increase the contrast of image, the following methods are proposed in the prior arts:

(1) Angle selection: since the incident angle of the light from the projector light source and the ambient light are different, the angle selection can be made through light directivity.

(2) Polarization selection: when the ambient light is an unpolarized light and the light from the projector light source is designed as a polarized light, the polarization selection can be achieved.

(3) Wavelength selection: since the projector light source is an RGB light source while the ambient light has a broadband spectrum, the wavelength selection can be achieved.

The angle selection method for improving the contrast between the light from the projector light source and the ambient light and increasing the viewing angle is disclosed in U.S. Pat. Nos. 1,942,841, 4,298,246, 5,096,278 and Taiwan Patent No. 293887.

Taiwan Patent No. 293887 discloses a method of increasing the screen contrast by adjusting spacing of retro-reflective material areas using a self-aligning method. However, the method still has some drawbacks to be solved.

FIG. 1A shows a lens unit as disclosed in Taiwan Patent No. 293887. The lens unit includes a micro lens 20, a light absorbing layer 21 and a reflective layer 23.

The micro lens 20 has a light incident surface 201 and a light emergent surface 202 opposing to the light incident surface 201. The light absorbing layer 21 is formed on the light emergent surface 202 of the micro lens 20 and has a cavity 211 filled with a transparent material or white material, for example $TiO_2$, such that when the light from the projector light source enters into the micro lens 20 and reaches the reflective layer 23, a pure reflective surface can be formed by the transparent material in the cavity 211 or a Lambertian surface can be formed by the white material in the cavity 211 for light reflection.

As shown in FIG. 1B, the cavity 211 of the lens unit is filled with a transparent material so as to form a pure reflective surface 22a, for example a mirror surface, for light reflection. When incident lights pass through the light incident surface 201 of the micro lens 20 and leave the light emergent surface 202 of the micro lens 20, and then reach the light absorbing layer 21 or the mirror surface 22a, the incident ambient light from the ambient environment of the projector in a direction S2 is absorbed by the light absorbing layer 21 and the incident light from the projector light source in a direction S1 reaches the mirror surface 22a and is reflected by the mirror surface 22a based on the rule that the angle of incidence is equal to the angle of reflection.

Therefore, the lens unit using the mirror surface 22a improves the light energy utilization efficiency, while such lens limits the viewing angle at the same time.

As shown in FIG. 1C, the cavity 211 of the lens unit is filled with a white material such as white photoresist so as to form a Lambertian surface 22b. When incident lights pass through the light incident surface 201 of the micro lens 20 and leave the light emergent surface 202 of the micro lens 20, and then reach the light absorbing layer 21 or the Lambertian surface 22b, the incident ambient light from the ambient environment of the projector in a direction S2 is absorbed by the light absorbing layer 21 and the incident light from the projector light source in a direction S1 is uniformly diffused by the Lambertian surface 22b. As shown in FIG. 2, the Lambertian surface 22b uniformly diffuses the incident light. However, light with a relative large angle ($\theta$>$\theta$c) will be constrained inside the lens unit due to the total internal reflection, and part of the constrained light will be reflected several times by the light incident surface 201 of the micro lens 20 and finally absorbed by the light absorbing layer 21, thereby reducing the whole luminance.

Therefore, the lens unit with the Lambertian surface 22b increases the viewing angle but decreases the light energy utilization efficiency.

Accordingly, there is a need to provide a lens unit and a projection screen made of the same so as to increase the light energy utilization efficiency and increase the viewing angle.

SUMMARY OF THE INVENTION

To overcome the above drawbacks, the present invention provides a lens unit and a projection screen made of the same so as to prevent interference of ambient light, increase the viewing angle of the projection screen and improve the light energy utilization efficiency.

According to an embodiment of the present invention, the lens unit includes a micro lens having a light incident surface and a light emergent surface opposing the light incident surface; a light absorbing layer formed on the light emergent surface of the micro lens and formed with a cavity; a scattering layer formed in the cavity of the light absorbing layer and made of a transparent resin mixed with scattering particles; and a reflective layer formed on the light absorbing layer and the scattering layer.

According to another embodiment of the present invention, a projection screen comprising a plurality of the lens units is further provided. The incident lights pass through the micro lens includes incident ambient light that comes from the ambient environment of the projector and incident light from the projector light source. The incident lights pass through the light incident surface of the micro lens and emit from the light emergent surface of the micro lens, and then reach the light absorbing layer, or pass through the scattering layer and reach the reflective layer. Therein, the incident ambient light that comes from the ambient environment of the projector is absorbed by the light absorbing layer while the incident light from the projector light source converged on the reflective layer is reflected by the reflective layer to the scattering layer. Further, the scattering layer adjusts the light reflected by the reflective layer such that the scattering angle of the incident light reflected by the reflective layer and scattered by the scattering layer is adjusted by the scattering layer without causing a total internal reflection in the micro lens.

According to another embodiment of the present invention, the scattering layer of the lens unit can be used to adjust the viewing angle of the projection screen and improve the energy utilization efficiency of incident light. Therefore, the projection screen made of the lens unit according to an embodiment of the present invention has a horizontal viewing angle close to that of a Lambertian surface and an increased optical gain.

Therefore, the lens unit and the projection screen made of the lens unit according to an embodiment of the present invention overcome the conventional drawbacks including (1) high energy utilization efficiency of incident light but small viewing angle occurring to a projection screen made of a lens unit with a mirror surface; and (2) large viewing angle but low energy utilization efficiency of incident light occurring to a projection screen made of a lens unit with a Lambertian surface.

Accordingly, a projection screen having large viewing angle, high optical gain and high image contrast is achieved by the lens unit according to an embodiment of the present invention.

DETAILED DESCRIPTION OF PREFERRED EMBODIMENTS

The following illustrative embodiments are provided to illustrate the disclosure of the present invention, these and other advantages and effects can be apparent to those skilled in the art after reading the disclosure of this specification.

Figure 1A:
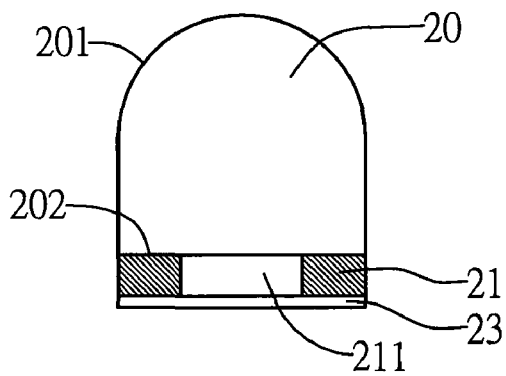
FIG. 1A is a schematic view showing a basic structure of a conventional lens unit disclosed by Taiwan Patent No. 293887.
Figure 1B:
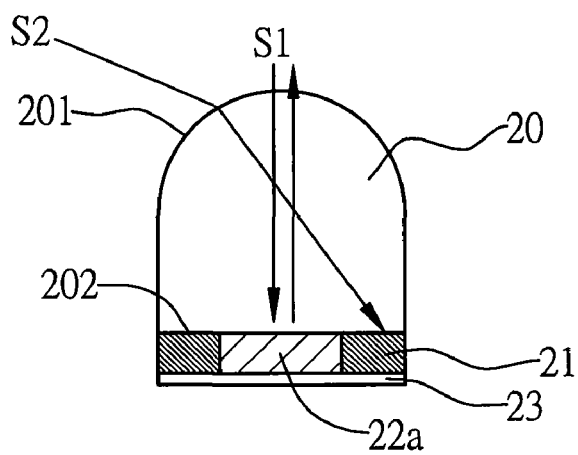
FIG. 1B is a schematic view showing reflection of light via a pure reflection surface formed by filling the cavity of the conventional lens unit of FIG. 1A with a transparent material.
Figure 1C:
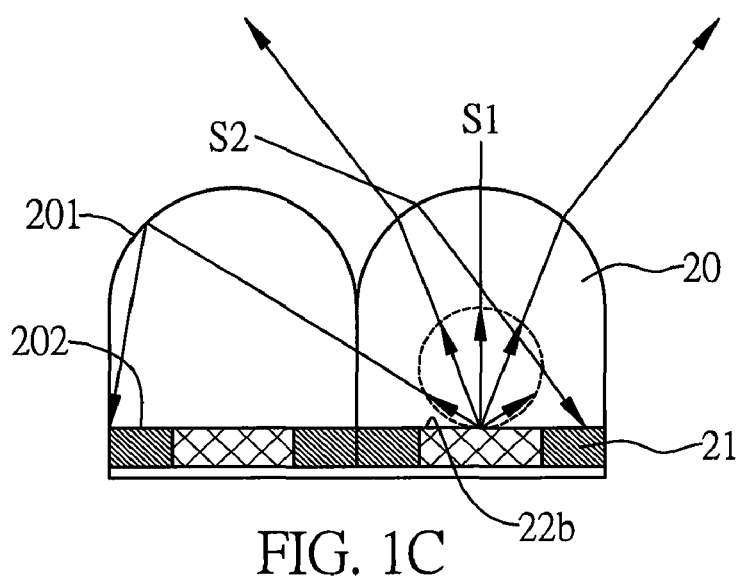
FIG. 1C is a schematic view showing reflection of light via a Lambertian surface formed by filling the cavity of the conventional lens unit of FIG. 1A with a white material.
Figure 2:
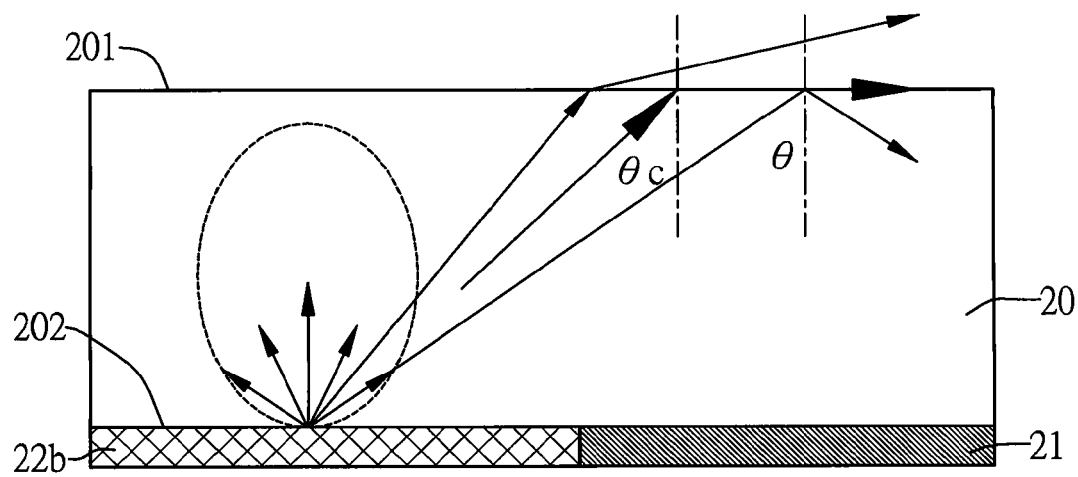
FIG. 2 is a schematic view showing uniform diffusion of incident light by the Lambertian surface of FIG. 1C.
Figure 3:
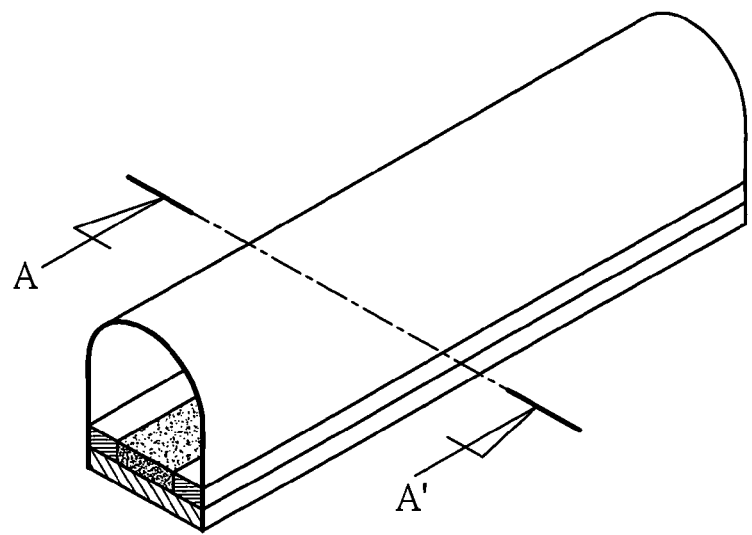
FIG. 3 is a pictorial view showing a lens unit according to an embodiment of the present invention.
Figure 4A:
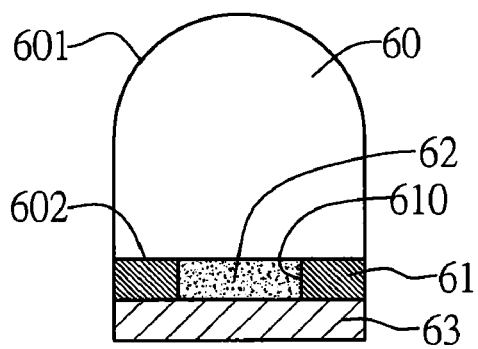
FIG. 4A is a cross-sectional view showing the lens unit taken along section line AA' of FIG. 3.
Figure 4B:
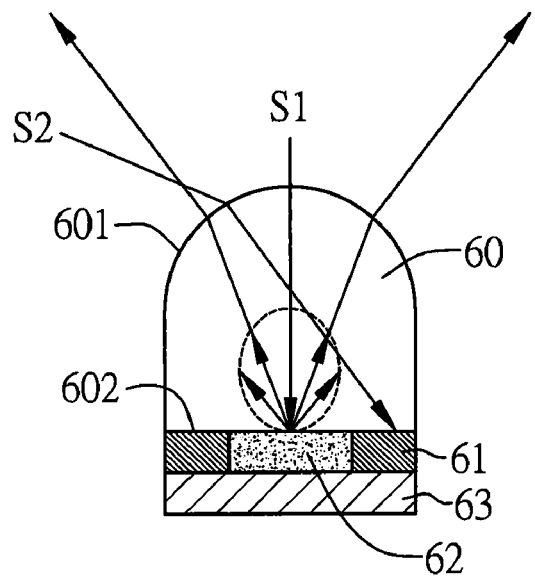
FIG. 4B is a schematic view showing scattering of incident light by the lens unit of FIG. 4A.
Figure 4C:
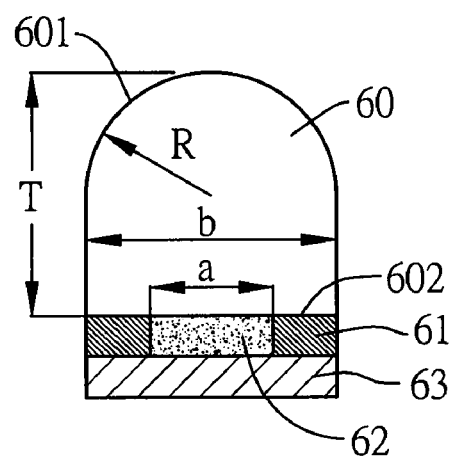
FIG. 4C is a schematic view showing sizes of the component parts of the lens unit of FIG. 4A.

FIG. 3 shows a lens unit according to an embodiment of the present invention. FIG. 4A is a cross-sectional view showing the lens unit taken along sectional line AA' of FIG. 3. FIG. 4B is a schematic view showing scattering of incident light by the lens unit of FIG. 4A. FIG. 4C is a schematic view showing sizes of the component parts of the lens unit of FIG. 4A.

As shown in FIG. 4A, a lens unit includes a micro lens 60, a light absorbing layer 61, a scattering layer 62 and a reflective layer 63. The micro lens 60 has a light incident surface 601 and a light emergent surface 602 opposing to the light incident surface 601, wherein the micro lens is made of a transparent material without absorbing light. The light absorbing layer 61 is formed on the light emergent surface 602 of the micro lens 60 and has a cavity 610. The scattering layer 62 is formed in the cavity 610 of the light absorbing layer 61 and is made of a transparent resin mixed with scattering particles, and the light absorbing layer 61 is made of a mixture of a resin and a color material, wherein the color material is, for example, carbon black, pigment or dyestuff. The reflective layer 63 is formed on the light absorbing layer 61 and the scattering layer 62, and the composition of the reflective layer 63 is made of metal with high reflectivity, such as silver, aluminum and chromium, etc.

When the lens unit of FIG. 4A is used to make a projection screen for projection, as shown in FIG. 4B, incident lights pass through the light incident surface 601 of the micro lens 60 and emit from the light emergent surface 602 of the micro lens 60, and then reach the light absorbing layer 61 (incident light in a direction S2), or pass through the scattering layer 62 and reach the reflective layer 63 (incident light in a direction S1). The incident ambient light in a direction S2 that comes from the ambient environment of a projector is converged on the light absorbing layer 61 and absorbed by the light absorbing layer 61. The incident light in a direction S1 that comes from the projector light source in front of the lens unit is converged on the reflective layer 63 and reflected by the reflective layer 63 to the scattering layer 62.

The scattering layer 62 adjusts incident light reflected by the reflective layer 63 such that the scattering angle of the incident light reflected by the reflective layer 63 and scattered by the scattering layer 62 is adjusted by the scattering layer 62 without causing a total internal reflection in the micro lens 60, thereby allowing the scattered light to pass through the micro lens 60 and emit towards the projector, i.e. towards the audience.

Figure 5:
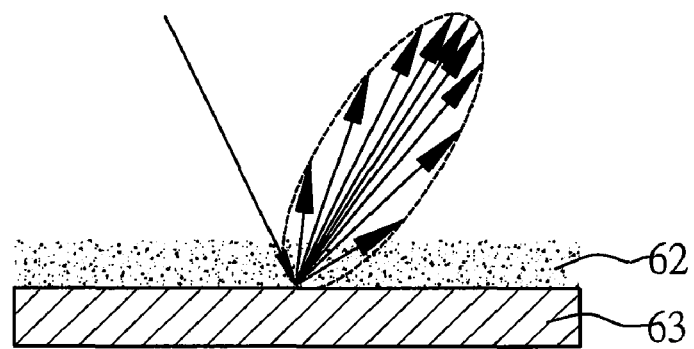
FIG. 5 is a schematic view showing scattering angles of the incident light reflected by the reflective layer and scattered by the scattering particles of the scattering layer of the lens unit according to an embodiment of the present invention.

FIG. 5 is a schematic view showing scattering angles of the incident light reflected by the reflective layer and scattered by the scattering particles of the scattering layer of the lens unit according to an embodiment of the present invention. As shown in FIG. 5, when the incident light passes through the scattering layer 62 and reaches the reflective layer 63, the incident light is reflected by the reflective layer 63 to the scattering layer 62, and the scattering layer 62 uniformly scatters the reflected light in specific directions. Therefore, the scattering particles of the scattering layer 62 could adjust the scattering angle of the incident light reflected by the reflective layer 63. In other words, the scattering particles make the reflected light have specific angle distribution for preventing a total internal reflection inside the micro lens 60 of the incident light reflected by the reflective layer 63.

Figure 6:
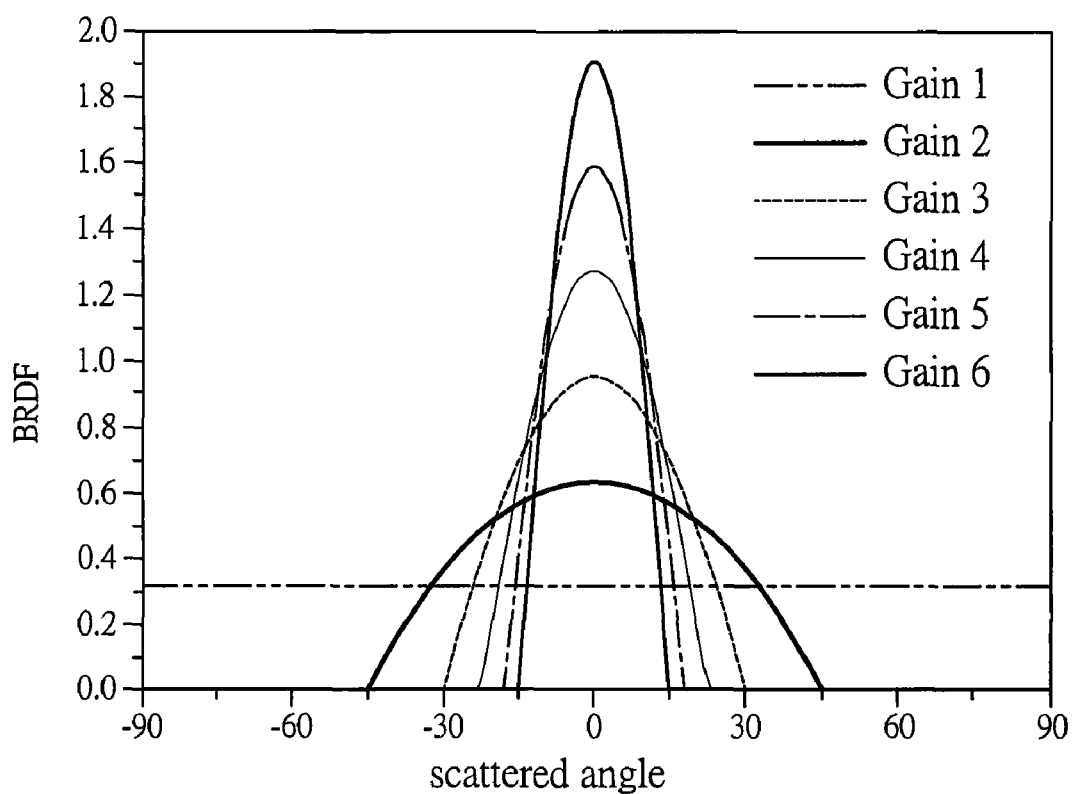
FIG. 6 is a reflective distribution view of scattered angles with different scattering characters of scattering layers of the lens unit according to an embodiment of the present invention.

Furthermore, as shown in FIG. 6, there is a distribution view of scattered angles with different scattering characters of scattering layers (that is, to change the gain of scattering layers from 1 to 6).

Therefore, the lens unit according to an embodiment of the present invention improves the energy utilization efficiency of incident light and increases the viewing angle through the scattering layer.

As shown in FIG. 4C, parametric values of the component parts of the lens unit according to an embodiment of the present invention are shown. In order to effectively improve the energy utilization efficiency of the incident light and increase the viewing angle, the parametric values of the component parts of the lens unit are illustrated in range.

As shown in FIG. 4C, the micro lens 60 has a thickness T and a width b, the light incident surface 601 has a radius of curvature R, and the scattering layer 62 has a width a. The relationships between the thickness T, the width b, the radius of curvature R and the width of scattering layer a are illustrated as, but not limited to, the follows.

The thickness T of the micro lens 60 is between 0.007 mm and 8 mm. The width b of the micro lens 60 is between 0.007 mm and 8 mm. The radius of curvature R of the light incident surface 601 is between 0.1 b and 5 b, that is, between 0.0007 mm and 40 mm. The width a of the scattering layer 62 is between 0.1 b and 0.9 b, that is, between 0.0007 mm and 7.2 mm. The width of the light absorbing layer 61 is the width b of the micro lens 60 subtracting the width a of the scattering layer 62. The thickness of the light absorbing layer 61 and the thickness of the reflective layer 63 are both between 0.001 mm and 1 mm. The ratio of the width a of the scattering layer 62 to the width b of the micro lens 60 is between 0.1 and 0.9. The scattering particles of the scattering layer 62 have a particle size between 0.1 µm and 100 µm. The refractive index of the scattering layer 62 is between 1 and 3. The scattering particles of the scattering layer 62 include at least one selected from the group consisting of air, metal, an inorganic material and an organic material.

The refractive index of the air is about 1. Example of the metal includes silver and aluminum. Example of the inorganic material includes anatase $TiO_2$ with a refractive index of approximately 2.49, rutile $TiO_2$ with a refractive index of approximately 2.9, MgO with a refractive index of approximately 1.74, $Al_2O_3$ with a refractive index of approximately 1.63, and $SiO_2$ with a refractive index of approximately 1.46. Example of the organic material includes polystyrene (PS) with a refractive index of approximately 1.59, polypropylene (PP), polyethylene terephthalate (PET), and polymethylmethacrylate (PMMA) with a refractive index of approximately 1.49.

Figure 7:
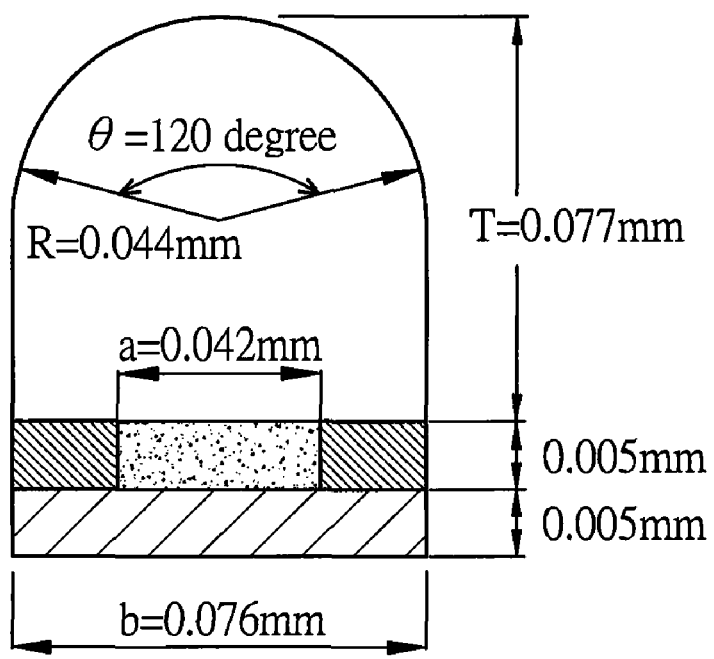
FIG. 7 is a schematic view showing the lens unit according to an embodiment of the present invention.

As shown in FIG. 7, there is further illustrating the lens unit according to an embodiment of the present invention by above parameter value ranges. When the thickness T of the micro lens is 0.077 mm, the width b of the micro lens is 0.076 mm, the radius of curvature R of the light incident surface is 0.044 mm, the width a of the scattering layer is 0.042 mm, the width of the light absorbing layer is the width b of the micro lens subtracting the width a of the scattering layer and equals 0.034 mm, the thickness of the light absorbing layer and the thickness of the reflective layer are both 0.005 mm, the ratio of the width a of the scattering layer to the width b of the micro lens is 0.55, the scattering particles of the scattering layer have a particle size of 0.24 µm in materials of anatase $TiO_2$, and the refractive index of the scattering layer is 2.49. The energy utilization efficiency and the viewing angle are increased by the particles characters in the scattering layers of the lens unit.

Figure 13A:
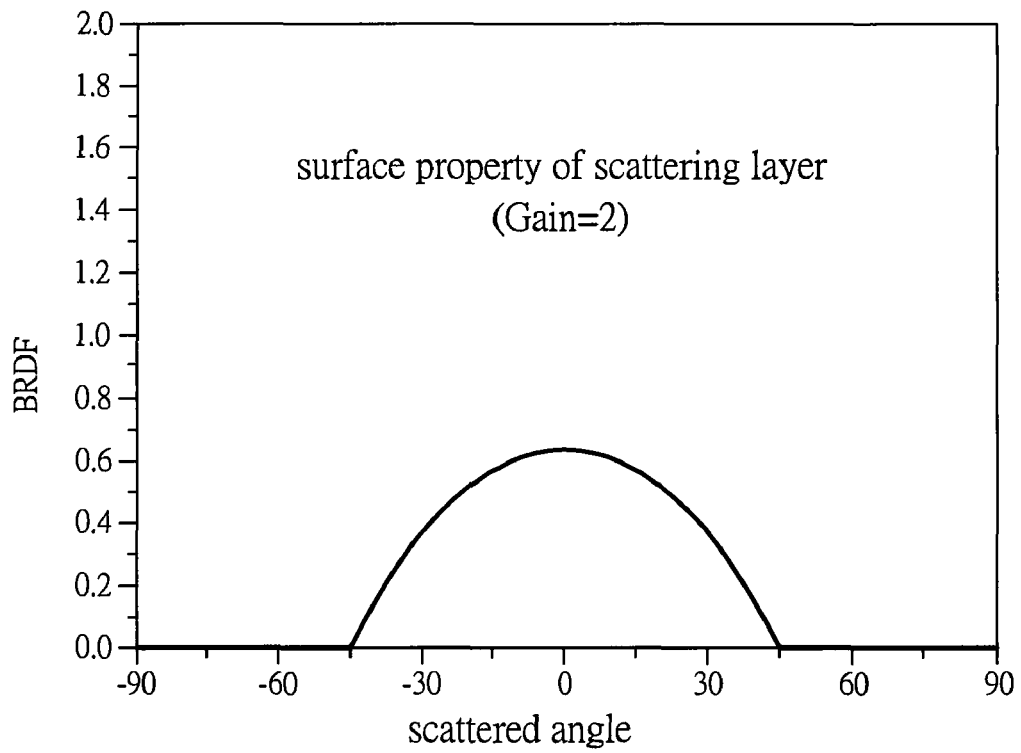
FIG. 13A is the diagram of bidirectional reflectance distribution function (BRDF) of scattering layer used in the lens unit in FIG. 7.
Figure 13B:
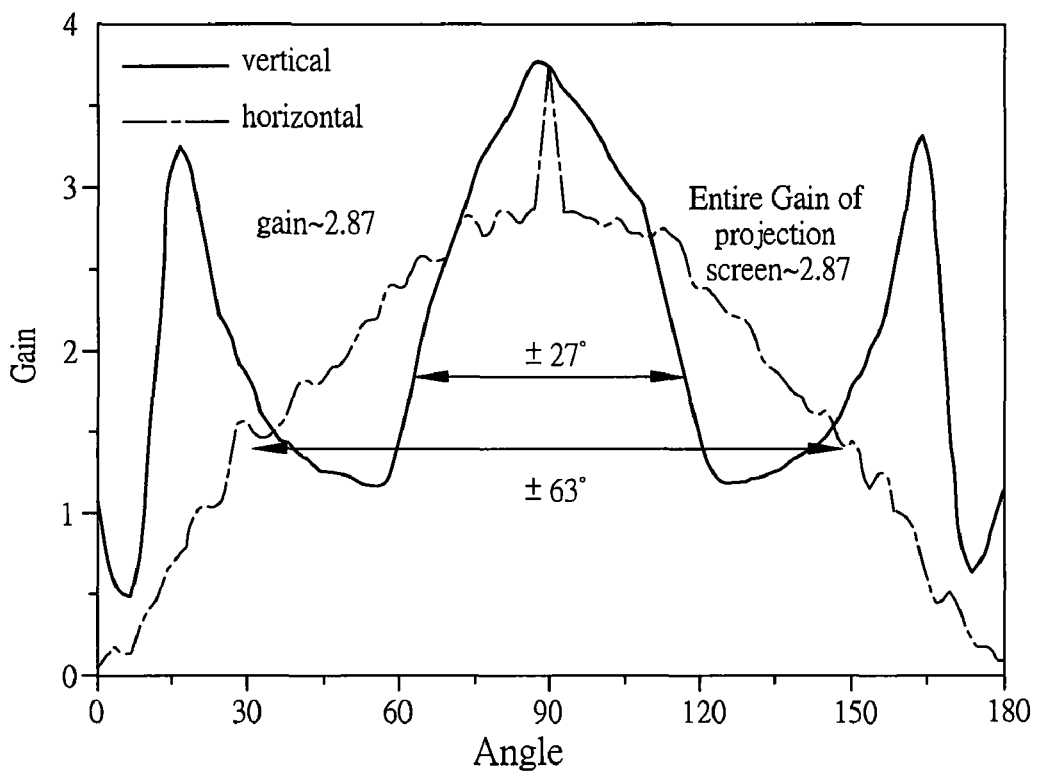
FIG. 13B is the relation of viewing angle and the optical gain provided by the entire projection screen composed by the lens unit in FIG. 7.

Furthermore, FIG. 13A is the diagram of bidirectional reflectance distribution function (BRDF) of the scattering layer in FIG. 7, and FIG. 13B is the viewing angle and optical gain provided by the entire projection screen structure made of the lens unit in FIG. 7. As shown in FIG. 13A, the character of the scattering layer adopted in the lens unit in FIG. 7 is kept within 45 degree scattered angle with optical gain of 2. As shown in FIG. 13B, the horizontal viewing angle, the vertical viewing angle, and the gain of the entire projection screen structure are ±63°, ±27°, and 2.87, respectively.

Furthermore, after making the projection screen by the lens unit with different scattering characters of scattering layers, the projection screen has the corresponding viewing angle and optical gain due to the different scattering characters of scattering layers, as shown in Table 1:

TABLE 1

| Scattering Layer Character | Luminance Gain | Horizontal Viewing Angle | Vertical Viewing Angle |
| --- | --- | --- | --- |
| Gain 1 | 1.48 | ±75° | ±30° |
| Gain 2 | 2.87 | ±63° | ±27° |
| Gain 3 | 4.07 | ±34° | ±25° |
| Gain 4 | 5.60 | ±23° | ±24° |
| Gain 5 | 6.72 | ±18.5° | ±23° |
| Gain 6 | 7.77 | ±16° | ±23° |

According the above description, the scattering layer may have influence on the viewing angle and the optical gain, and the viewing angle trades off the optical gain. Thus, the design of the lens unit depends on the requirement of the application environment. More specifically, Table 2 shows compositions of the scattering layers of the lens unit, wherein the scattering particles of examples 1 to 7 are made of $TiO_2$, cross-linked PS, or cross-linked PMMA, and are respectively mixed with a PMMA resin in a certain ratio so as to form the scattering layer.

As shown in Table 2, the scattering particles are made of, but not limited to, an inorganic material such as $TiO_2$, or an organic material such as cross-linked PS or cross-linked PMMA. The scattering particles are further mixed with a PMMA resin and filled in the cavity of the light absorbing layer to form the scattering layer. In other words, Table 2 illustrates using the PMMA resin as a carrier of the scattering particles. The types, particle size and concentration of the scattering particles can be adjusted according to the required viewing angle and optical gain of the projection screen made of the lens unit.

TABLE 2

| Example | Scattering Particles | Average particle size (μm) | Scattering Particles/ PMMA (wt %) |
| --- | --- | --- | --- |
| 1 | $TiO_2$ | 0.24 | 20/80 |
| 2 | Cross-linked PS particles | 5 | 25/75 |
| 3 | $TiO_2$ | 0.24 | 30/70 |
| 4 | $TiO_2$ | 0.24 | 45/55 |
| 5 | Cross-linked PS particles | 5 | 45/55 |
| 6 | Cross-linked PMMA particles | 30 | 45/55 |
| 7 | Cross-linked PMMA particles | 30 | 50/50 |

In particular, for a projection screen made of the above-described lens unit, the viewing angle and optical gain can be adjusted through the characteristic of the scattering particles of the scattering layer. The projection screen, for example, made of the lens unit having a scattering layer with the scattering particles of example 5 (45 wt % cross-linked PS particles with an average particle size of 5 μm) of Table 2 has a horizontal viewing angle of ±25 degree and an optical gain of 14. Further, the projection screen, for example, made of the lens unit having a scattering layer with the scattering particles of example 3 (30 wt % $TiO_2$ particles) of Table 2 has a horizontal viewing angle of ±85 degree and an optical gain of 3.

By using the scattering particles of the scattering layer, the incident light reflected by the reflective layer is scattered by the scattering layer so as to prevent a total internal reflection from occurring in the micro lens of the lens unit. Further, the types, particle size and concentration (wt %) of the scattering particles of the scattering layer can be adjusted to obtain the desired horizontal viewing angle of a projection screen made of the lens unit. Accordingly, a projection screen having a horizontal viewing angle close to that of a Lambertian surface of ±90 degree and an optical gain larger than 1 is realized.

Figure 8:
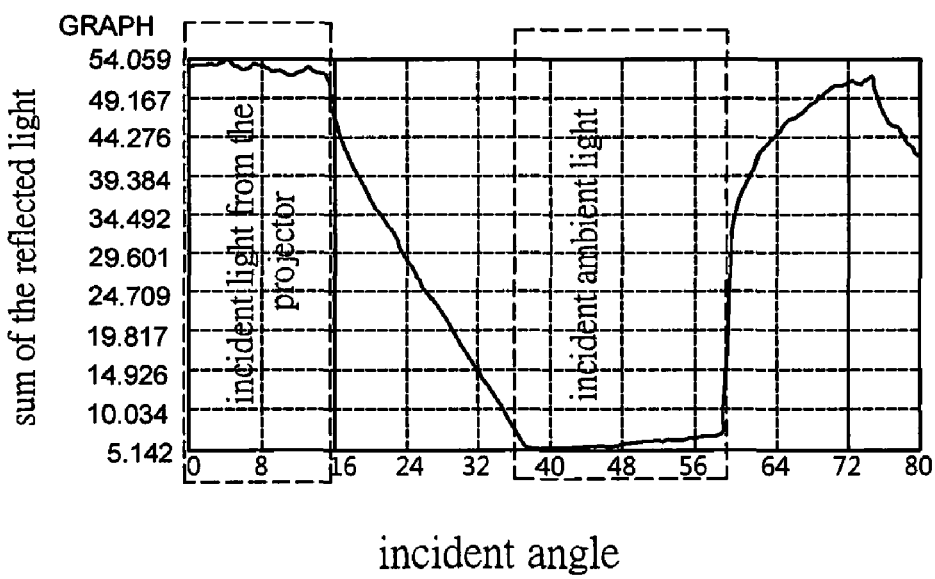
FIG. 8 is a simulating diagram showing the elimination effect of the ambient light in a projection screen made of the lens unit according to an embodiment of the present invention.

FIG. 8 is a simulating diagram showing an elimination effect of the ambient light in a projection screen made of the lens unit according to an embodiment of the present invention. For the incident light from the projector light source with a relatively small incident angle between 0 and 15 degree, the projection screen presents a reflecting characteristic. On the other hand, for the incident ambient light from the ambient environment around the projector with a relatively large incident angle between 35 and 60 degree, the projection screen presents an absorbing characteristic. Therefore, the projection screen made of the lens unit according to an embodiment of the present invention achieves an effect of reflecting incident light from the projector light source and absorbing the incident ambient light, thereby eliminating the interference of the ambient light and increasing the image contrast.

Figure 9A:
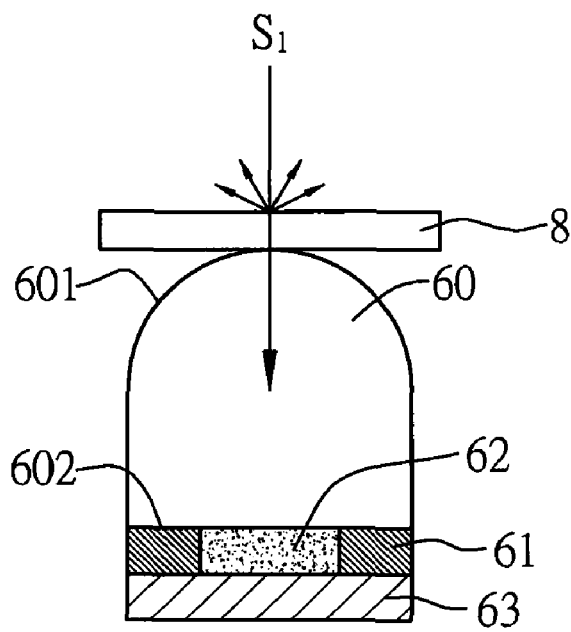
FIGS. 9A and 9B are schematic views illustrating lens units according to another embodiment of the present invention.
Figure 9B:
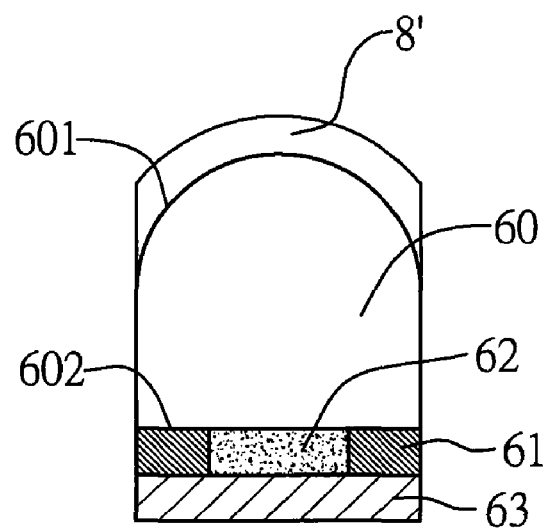

Further, FIGS. 9A and 9B are schematic views illustrating the lens unit comprising an optical film disposed on the light incident surface of the micro lens according to another embodiment of the present invention. In one aspect of the embodiment, a planar optical film 8 is formed on the incident surface 601 of the micro lens 60 of the lens unit as shown in FIG. 9A. In another aspect of the embodiment, an optical film 8' with a curved surface same as the light incident surface 601 is formed on the light incident surface 601 of the micro lens 60 of the lens unit as shown in FIG. 9B. The optical films 8 and 8' have the characteristic of low reflectance, diffuse reflectance, high transmittance, and specular transmission so as to prevent light glaring caused by reflection of strong light from the projector.

FIGS. 10A to 10E show a method for fabricating a projection screen according to an embodiment of the present invention.

Figure 10A:
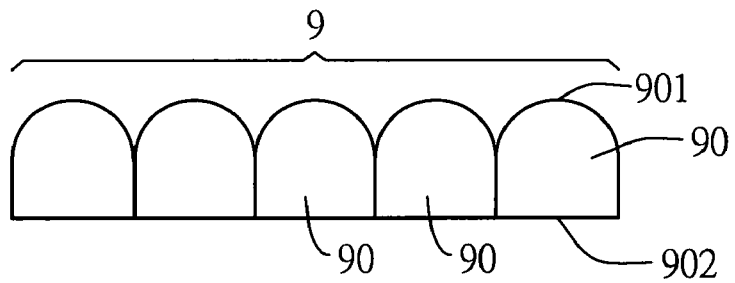
FIGS. 10A to 10E are schematic views showing fabrication steps of a projection screen according to an embodiment of the present invention.

As shown in FIG. 10A, a plurality of micro lenses 90 are arranged to form a micro lens array 9, wherein each of the micro lenses 90 has a light incident surface 901 and a light emergent surface 902 opposing to the light incident surface 901. The micro lens 90 is made of a transparent material without absorbing light. In an embodiment, the micro lenses 90 are made of a resin material such as PET (Polyethylene terephthalate).

Figure 10B:
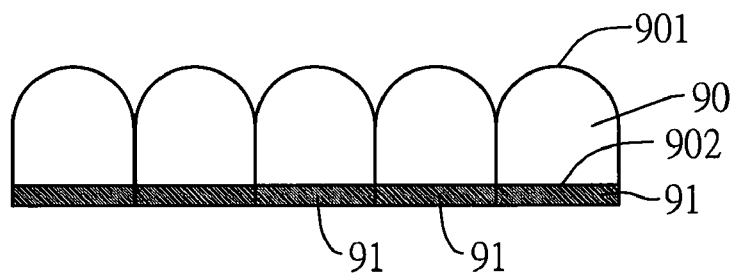

As shown in FIG. 10B, a light absorbing layer 91 is formed on the light emergent surface 902 of each of the micro lenses 90.

Figure 10C:
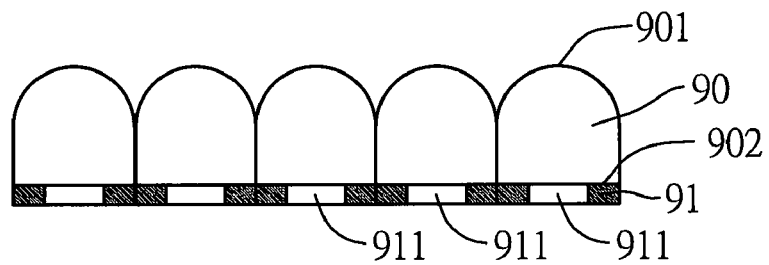

As shown in FIG. 10C, the light absorbing layer 91 on the light emergent surface 902 of each of the micro lenses 90 is patterned by conventional lithography techniques such as exposure and development so as to form a cavity 911 therein.

Figure 10D:
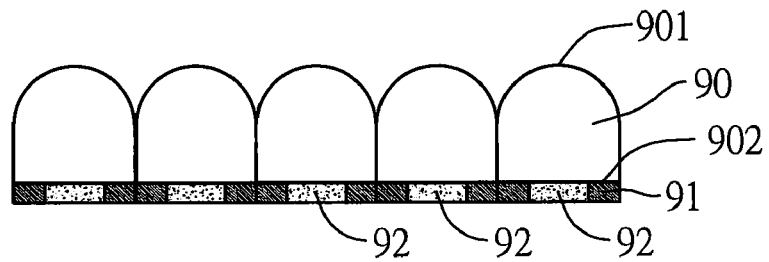

As shown in FIG. 10D, scattering particles are mixed with a transparent resin at a specific concentration, e.g., $TiO_2$ with a particle size of 0.24 μm are mixed with a transparent resin at a concentration ratio of 3:7. Then, the transparent resin blended with the scattering particles is coated to the cavity 911 of the light absorbing layer 91 by roll-to-roll printing or blade coating, thereby forming a scattering layer 92 in the cavity 911.

Figure 10E:
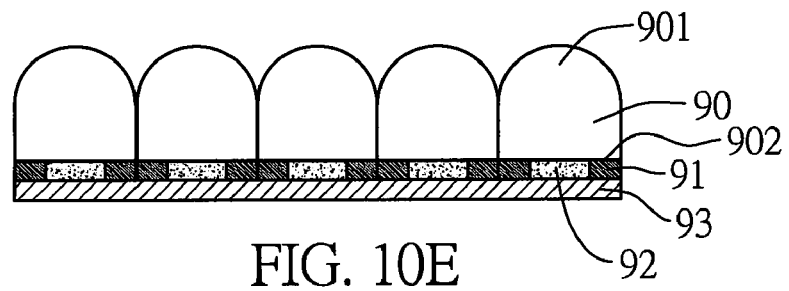
Figure 11:
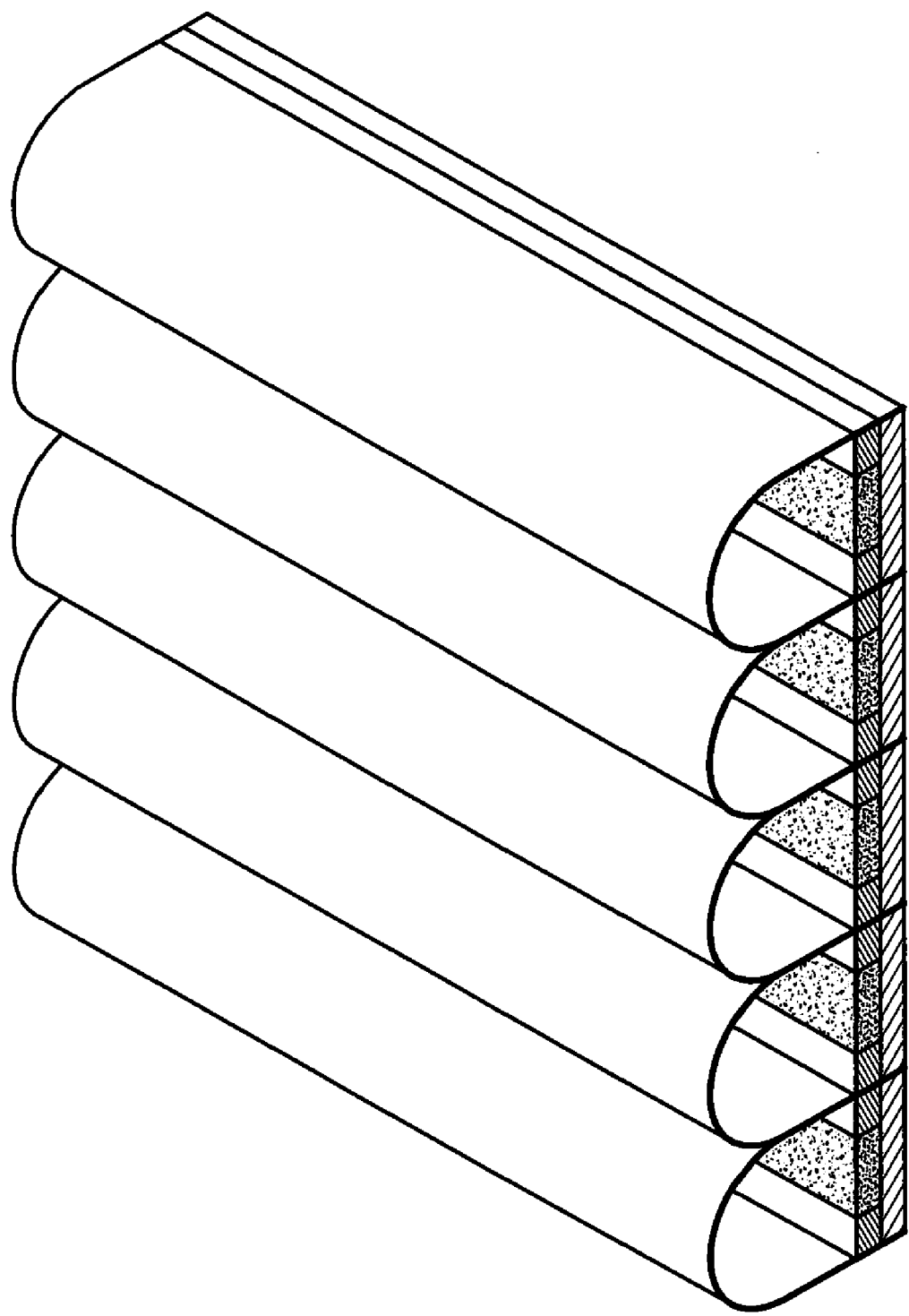
FIG. 11 is a partial view showing the projection screen made of the lens unit according to an embodiment of the present invention.

As shown in FIG. 10E, a reflective layer 93 is formed on the light absorbing layer 91 and the scattering layer 92. In an embodiment of the present invention, a silver reflective film is adhered to the light absorbing layer 91 and the scattering layer 92 to form the reflective layer 93. Referring to FIG. 11, which is a partial view showing the projection screen made of a plurality of the lens units according to an embodiment of the present invention.

Figure 12A:
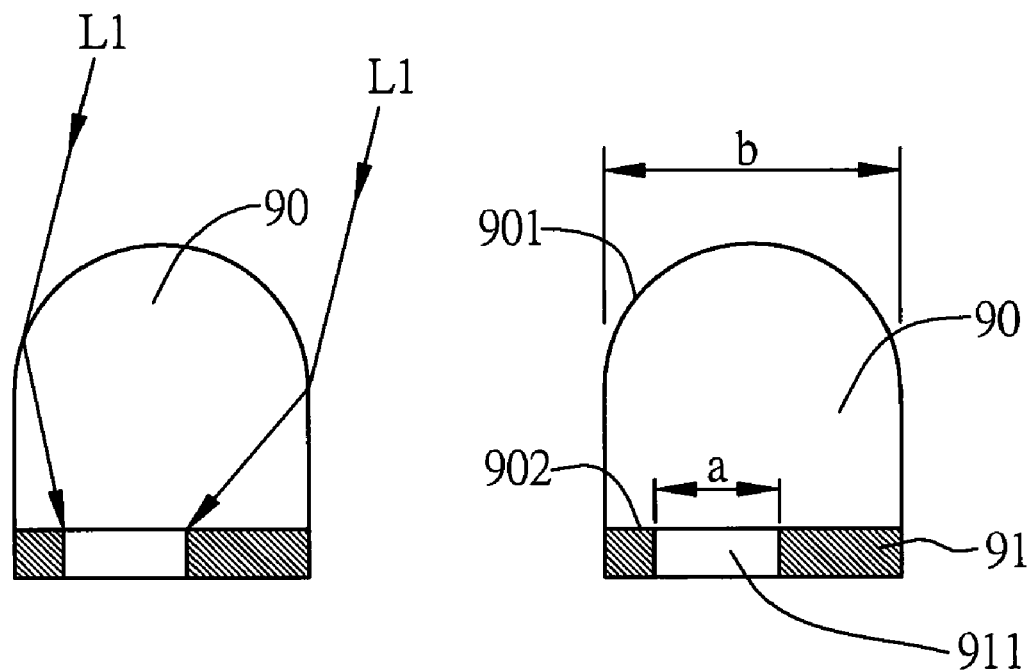
FIGS. 12A and 12B are schematic views showing methods for adjusting the width and position of the cavity through a self-aligning exposure process.
Figure 12B:
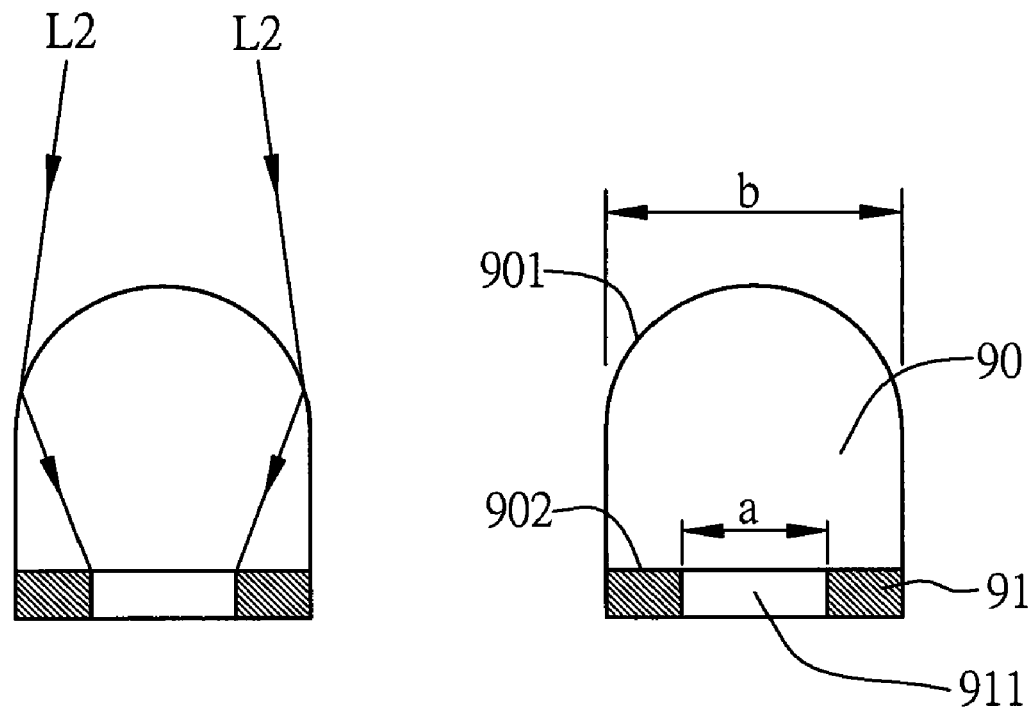

In an embodiment of the present invention, the light absorbing layer is patterned by exposure to form the cavity 911. In the exposure process, the width and position of each cavity 911 are adjusted through a self-aligning exposure process. As shown in FIGS. 12A and 12B, the ratio of the width a of the cavity 911 to the width b of the micro lens 90 and the position of the cavity can be set by adjusting the collimation and the incident angle of the exposure light source in the self-aligning exposure process. Further, the width of the cavity 911 and the position of the cavity 911 in the light absorbing layer 91 are corresponding to the location of the lens unit in the projection screen.

As shown in FIG. 12A, the incident lights L1 are not perpendicular to the micro lens 90 in a self-aligning exposure process. The position of the cavity 911 in the light absorbing layer 91 can be adjusted by changing the incident angle of the exposure light in the self-aligning exposure process.

As shown in FIG. 12B, the incident lights L2 in a self-aligning exposure process are not collimated lights. The width a of the cavity 911 can be adjusted by changing the collimations of the incident lights in the self-aligning exposure process.

Through the above-described fabrication processes of FIGS. 10A to 10E and 12A to 12B, the projection screen with high contrast, high optical gain and wide viewing angle is obtained.

The lens unit and the projection screen made of the same according to an embodiment of the present invention at least achieve the following effects:

(1) Rejecting the ambient light. The projection screen presents a reflecting characteristic for the incident light with a relatively small incident angle between 0 and 15 degree that comes from the projector in front of the projection screen while presenting an absorbing characteristic for the incident ambient light with a relatively big incident angle between 35 and 60 degree that comes from the ambient environment of the projector;

(2) Increasing the viewing angle. The scattering layer uniformly scatters the reflected light in specific directions, that is, the scattering particles of the scattering layer adjust the scattering angle of the incident light reflected by the reflective layer, thereby increasing the viewing angle to obtain a larger viewing angle of the projection screen compared with the prior art;

(3) Improving the energy utilization efficiency of incident light. When the incident light is reflected by the reflective layer and scattered by the scattering layer, the scattering angle of the incident light reflected by the reflective layer is adjusted for preventing a total internal reflection in the lens unit. Therefore, the scattered light can be outputted towards the projector without being absorbed by the light absorbing layer, thereby improving the energy utilization efficiency of incident light compared with the prior art;

(4) Adjusting the optical gain. By mixing scattering particles with different characteristics in the scattering layer, the horizontal viewing angle and the optical gain of the projection screen can be improved;

(5) Facilitating large area fabrication. By forming a light absorbing layer, a scattering layer and a reflective layer on the light emergent surfaces of the lens unit array through a self-aligning exposure process, a projection screen with high energy utilization efficiency of incident light and large viewing angle can be fabricated.

Accordingly, the lens unit and the projection screen made of the same according to an embodiment of the present invention improves the energy utilization efficiency of incident light and increases the viewing angle through the scattering layer of the lens unit, thereby overcoming the conventional drawbacks.

The above-described descriptions of the detailed embodiments or the example are only to illustrate the preferred implementation according to the present invention, and it is not to limit the scope of the present invention. Accordingly, all modifications and variations completed by those with ordinary skill in the art should fall within the scope of present invention defined by the appended claims.

What is claimed is:

1. A lens unit, comprising:
   a micro lens having a light incident surface and a light emergent surface opposing the light incident surface;
   a light absorbing layer formed on the light emergent surface of the micro lens and formed with a cavity;
   a scattering layer formed in the cavity of the light absorbing layer and made of a transparent resin blended with scattering particles; and
   a reflective layer formed on the light absorbing layer and the scattering layer,
   wherein an incident light reflected by the reflective layer is adjusted by the scattering layer to be scattered without a total internal reflection in the micro lens.

2. The lens unit of claim 1, wherein the micro lens is made of a transparent material without absorbing light.

3. The lens unit of claim 1, wherein the light absorbing layer is made of a mixture of a resin and a color material.

4. The lens unit of claim 3, wherein the color material is carbon black, pigment or dyestuff.

5. The lens unit of claim 1, wherein the reflective layer is made of metal with high reflectivity.

6. The lens unit of claim 5, wherein the metal with high reflectivity are silver, aluminum or chromium.

7. The lens unit of claim 1, wherein the micro lens has a thickness between 0.007 mm and 8 mm.

8. The lens unit of claim 1, wherein the light incident surface of the micro lens is a curved surface with a radius of curvature between 0.0007 mm and 40 mm.

9. The lens unit of claim 1, wherein the micro lens has a width between 0.007 mm and 8 mm.

10. The lens unit of claim 1, wherein the scattering layer has a width between 0.0007 mm and 7.2 mm.

11. The lens unit of claim 1, wherein a ratio of a width of the scattering layer to a width of the micro lens is between 0.1 and 0.9.

12. The lens unit of claim 1, wherein a refractive index of the scattering layer is between 1 and 3.

13. The lens unit of claim 1, wherein the scattering particles of the scattering layer have particle sizes between 0.1 µm and 100 µm.

14. The lens unit of claim 1, wherein the light absorbing layer has a thickness between 0.001 mm and 1 mm.

15. The lens unit of claim 1, wherein the reflective layer has a thickness between 0.001 mm and 1 mm.

16. The lens unit of claim 1, wherein the scattering particles of the scattering layer are made of at least one material selected from a group consisting of an inorganic material, an organic material, air and metal.

17. A projection screen comprising a plurality of the lens units of claim 1.

* * * * *